United States Patent [19]
Greene

[11] 3,993,360
[45] Nov. 23, 1976

[54] APPARATUS FOR SAFETY BRAKING OF VEHICLES

[76] Inventor: Clarence Kirk Greene, 100 N. Arlington Ave., Reno, Nev. 89501

[22] Filed: Mar. 26, 1975

[21] Appl. No.: 562,042

[52] U.S. Cl. .................................. 303/3; 188/112; 303/10
[51] Int. Cl.² .................................. B60T 13/68
[58] Field of Search ............ 180/14 A, 14 R, 44 F, 180/66 R, 44 M; 303/2, 3, 10, 7, 18, 15, 20; 188/3, 112; 60/428

[56] References Cited
UNITED STATES PATENTS

| | | | |
|---|---|---|---|
| 2,729,298 | 1/1956 | Tourneau | 180/14 A X |
| 3,700,060 | 10/1972 | Keene et al. | 180/66 R X |
| 3,823,792 | 7/1974 | Dinkloh et al. | 180/44 F X |
| 3,841,423 | 10/1974 | Holtkamp et al. | 180/44 F X |

*Primary Examiner*—Trygve M. Blix
*Assistant Examiner*—Douglas C. Butler
*Attorney, Agent, or Firm*—Herbert C. Schulze

[57] ABSTRACT

A method and an apparatus for performing said method, for the safety braking of automotive vehicles wherein a trailer is pulled by a prime mover, in such manner so as to eliminate the problems of jack-knifing and the like on sudden stops, and wherein a feature of the method and apparatus involves the dynamic augmentation of the braking torque of an over-driven motor, where the motor is connected to the trailer wheels and the friction brake is added to the negative torque of the over-driven motor in proportion to the negative torque generated by the over-driven motor during deceleration.

5 Claims, 3 Drawing Figures

APPARATUS FOR SAFETY BRAKING OF VEHICLES

CROSS REFERENCE TO RELATED PATENT APPLICATIONS

This application is not related to any applications filed by me relating to the braking of an automotive vehicle.

BACKGROUND OF THE INVENTION

1. Field of the Invention

This invention is in the general field of braking systems for automotive trailers pulled by primed movers, such as, trucks, tractors, and the like. The invention is more particularly in the field of a braking method and apparatus in which the trailer braking is activated by, and proportional to, the deceleration dynamics transmitted between the tractor and trailer by a porportional division of forces.

2. Description of the Prior Art

Many braking systems have been proposed for truck trailer combinations, and the like; Likewise, certain arrangements have been proposed by which power is transmitted to the wheels of trailers, and other vehicles. For example, my U.S. Pat. No. 3,702,642 has reference to driving systems for the wheels of automotive trailers and other vehicles. In the field of brakes, there are many hydraulic brakes, electrical brakes, and other auxiliary braking systems for various purposes and applications to trailers and the like.

However, the present invention is unique in providing a disc braking system for trailers pulled by prime movers, in which a method is provided, as well as an apparatus for practicing such method, in which the braking system is activated by a proportional power differential during deceleration of the prime mover and trailer combined in such manner as to take advantage of the changing ratio of input to output of an hydraulic pump-motor system providing motive power to the trailer wheels.

SUMMARY OF THE INVENTION

A cause of highway accidents is the peculiar directional forces of trailers being towed by prime movers during stopping, or braking. In such conditions, especially in stopping under adverse conditions such as at relatively high speeds or on wet surfaces, loss of control of the trailer is common; Particularly, a trailer may "jack-knife" or take other course of travel in stopping which creates side forces resulting in overturning of such vehicles during stopping and/or sweeping of such vehicles across, or off of, the road, wherein the trailer tends to run beyond the normal alignment to the rear of the prime mover.

Ideally, in every vehiclular stop, the vehicle will stop over its entire length in the direction in which it was travelling with its longitudinal direction remaining in that direction. It is toward this goal that this invention is directed.

Many different types of braking systems have been proposed, but, in each case such systems have deficiencies wherein brakes lock, particularly with reference to one wheel or the like, creating conditions which do not result in an appropriate transmission of braking forces to the trailer so as to tend to stop it in a direct longitudinal relationship to its line of travel behind its prime mover.

In the past, I have been involved in inventions relating to the transmissions of driving power to the wheels of automotive trailers, and such inventions are particularly exemplified by my above mentioned U.S. Pat. No. 3,702,642.

In connection with my work in this field, I have made observations which have resulted in my invention of this braking method and apparatus, and in which an hydraulic driving system is utilized to activate an auxiliary braking system upon a trailer during appropriate conditions of deceleration and normal braking, such that proportionate transmission of power will proportionately transmit braking power in a safe manner such that the trailer jack-knifing and other difficulties will be alleviated.

I accomplish this by connecting an hydraulic pump to the driving mechanism of the truck or truck tractor or other prime mover involved, and pumping hydraulic fluid by means of said pump to an hydraulic motor attached to a driving mechanism for the trailer wheels. Thus, as the hydraulic pump is activated, the hydraulic motor is activated and imparts traction to the trailer wheels. A portion of the power which otherwise would be transmitted to the truck tractor's driving wheels is now divided by the hydraulic system and directed to the wheels of the trailer. The overall result is the essential retention of all driving power to the vehicle, as a whole, but, with equality of, and general distribution of, the power throughout the entire truck trailer system.

During normal driving, it will be understood that the power of the truck tractor will be transmitting a portion of itself to the wheels of the trailer. On the other hand, when the vehicle is under compression and slowing, the motor itself builds a pressure under the compression of the deceleration force in which the return pressure to the pump is actually higher than the feed pressure to the motor. Thus, in effect, the motor has become a pump and the pump has become a motor.

I have devised a system and method and apparatus by which I utilize this reverse pressure situation to activate an auxiliary, hydraulically operated brake arrangement upon the trailer during those periods of time when the back pressure from the motor to the pump is great. Since this power is being applied proportionately to the force being applied to the truck and tractor wheels in their forward movement, the braking power is so controlled that if the trailer has a tendency to "over run" the truck, the excess force applied to the hydraulic system in its reverse operating arrangement more effectively applies the auxiliary trailer brake, and prevents such over running, and maintains a balance between the condition of the prime mover and the trailer.

I have had to overcome certain additional problems in that generally it would be undesirable to apply these auxiliary brakes when the truck is in reverse, in which condition there will be a backward operation of the pump, which would create a pressure condition which might otherwise apply these brakes. Likewise, I have found it necessary to be certain that the brakes would not falsely apply in the normal compression when slowing and when auxiliary braking was not desired. I have accomplished this by utilizing the truck back-up lighting systems to control special valving to avoid errors, and by utilizing pressure switches for basic control.

It is an object of this invention to provide a mthod and apparatus for applying brakes to a trailer such that it will not over run its prime mover;

Another object of this invention is to provide a braking method and apparatus for trailers which is activated by pressure differential created in a proportional transfer of power between the prime mover and the trailer by hydraulic means;

Another object of this invention is to provide such a braking method and apparatus as heretofore mentioned in which the relative speed of travel of the wheels of the prime mover and the trailer will be controlled by their own proportional dynamic force differentials.

Another object of this invention is to provide a method and apparatus for dynamically augmenting the braking torque of an over-driven motor attached to the wheels of a trailer pulled by a prime mover.

Another object of this invention is to provide a non-locking brake for vehicles as described without the necessity of the addition of expensive electronic sensors or the like.

The foregoing and other objects of this invention will be clear and will be understood by those skilled in the art upon reading the Description of a Preferred Embodiment which follows in conjunction with the appended drawings.

DESCRIPTION OF A PREFERRED EMBODIMENT

Figure 1:
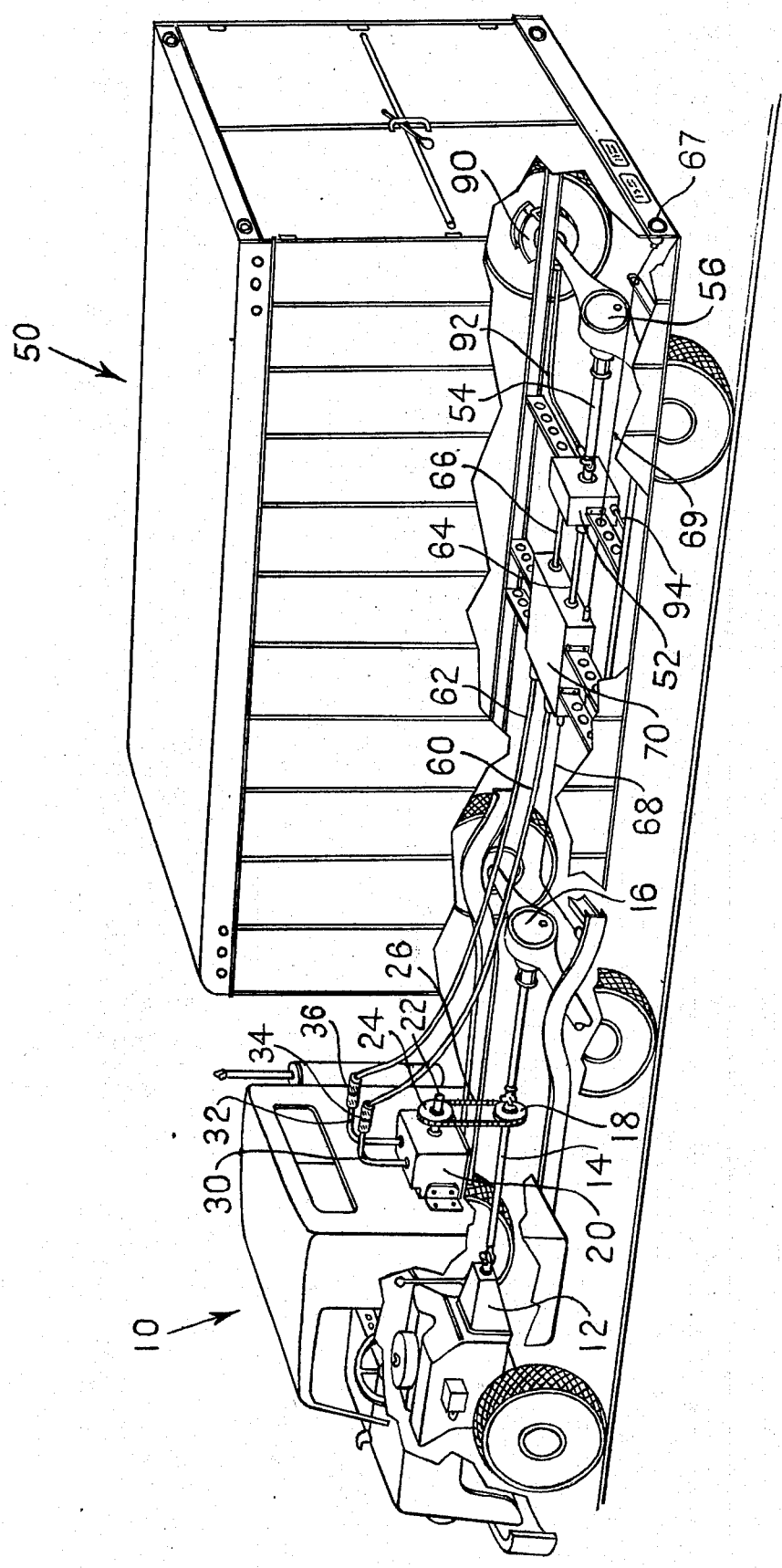
FIG. 1 is a perspective of a truck-trailer combination with certain parts broken away and with elements of an apparatus to practice the method of this invention shown in block diagram form.

FIG. 1 illustrates a customary truck-trailer arrangement in which the prime mover, or truck, or tractor 10 is carrying with it a trailer 50, normally by means known in the art as a "fifth wheel", but by other means if so indicated.

The prime mover 10 will, of course, be so equipped with an engine, wheels, and the like, so as to be operative by a human operator, as is known in the art. There will be normally, a transmission 12, through which the operator of the vehicle may change gears, and there will be a drive shaft 14, which will supply the power to a differential arrangement 16 in order to propel the vehicle.

In this invention, a sprocket 18, or suitable substitute is attached to the drive shaft 14 and such sprocket 18 drives a chain 26 which further drives sprocket 24 on shaft 22 which is the drive shaft of an hydraulic pump 20.

The hydraulic pump 20 has two hydraulic lines 30 and 32 normally the pressure, and return lines from the pump which are coupled by couplings 34 and 36 to lines 60 and 62.

The lines 30 and 32 are coupled by a male connection within the overall coupling 34 and a female connection within the overall coupling 36 so that the two may be connected together if desired, and the reverse, of course, is true as to the couplings with relation to lines 60 and 62.

A power package 70 has been supplied into which the hydraulic power lines 60 and 62 will feed, and from which hydraulic power lines 64 and 66 will connect to hydraulic motor 52. Hydraulic motor 52 has an output shaft 54 appropriately coupled so as to drive differential arrangement 56 which imparts motion to the rear wheels of the trailer. Other elements shown in FIG. 1, and which will be described in connection with some of the other FIGS. are back-up lights 67, electrical wiring 69, hydraulic pressure line 92, and disc brake 90.

Figure 2:
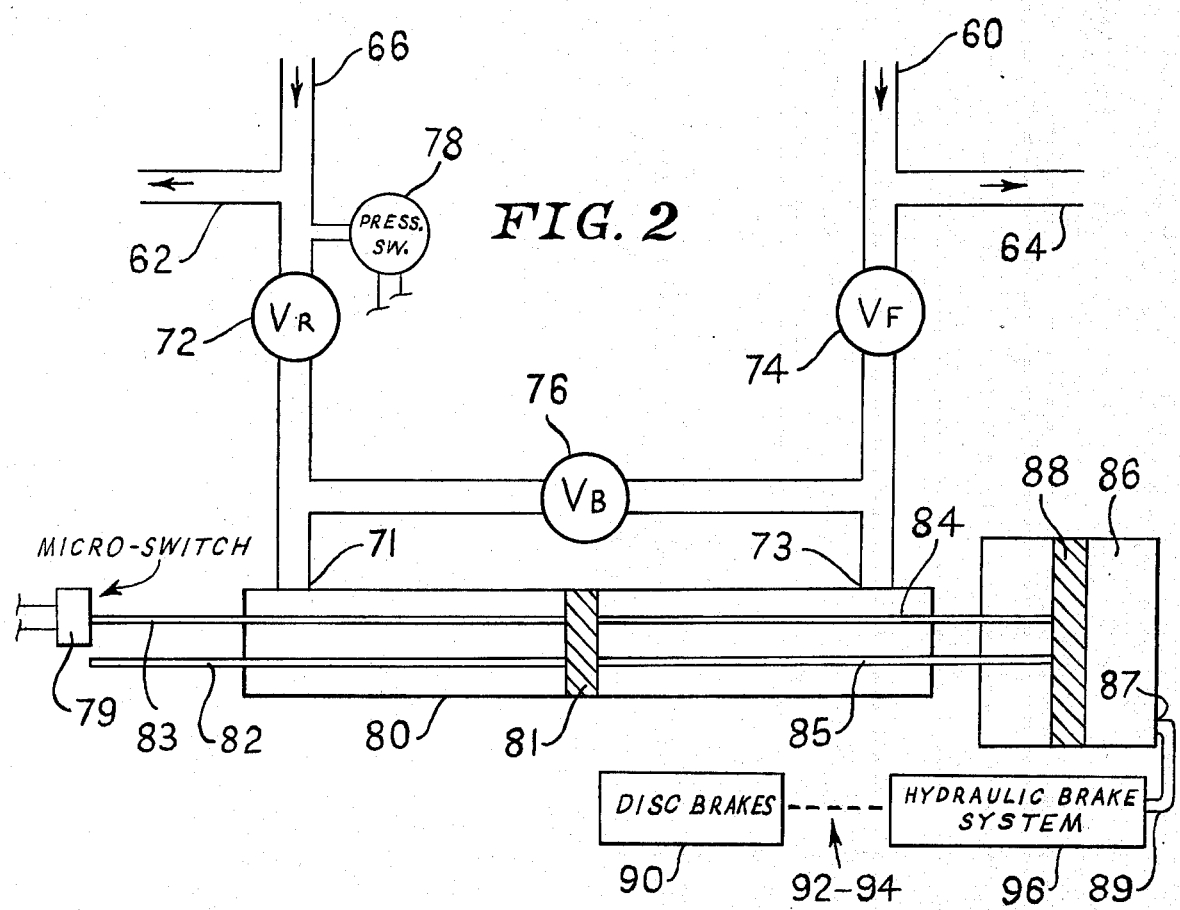
FIG. 2 is a schematic drawing of the hydraulic system utilized to activate the brakes in an apparatus practicing the method of this invention.

Turning attention now to FIG. 2, the elements of the device within the control box 70 are illustrated. The pressure line 60 from the hydraulic pump will be appropriately coupled to feed line 64 which is the hydraulic feed power to hydraulic motor 52. There will also be a coupling at this point (probably accomplished by a means of a tee) so that the same power and flow line 60-64 is connected to valve 74. On the other side of valve 74 there is another appropriate connection, again probably by tee or the like, by which the outlet from valve 74 will flow jointly to the hydraulic cylinder port 73 and to valve 76.

Valve 76 is connected at its other outlet again by a tee connection or the like as will be understood by those skilled in the art to the hydralic cylinder port 71 and also to one outlet of valve 72.

The other outlet of valve 72 is interconnected by appropriate connections as will be understood so as to interconnect to a line leading to pressure switch 78, the return line 66 from the hydraulic motor, and the return 62 to the hydraulic pump.

Hydraulic cylinder 80 may be of customary construction having a single rod on each end of piston 81, or could be a specialized construction as herein shown in which there are two rods 82 and 83 connected on one end of piston 81 and two rods 84 and 85 on the other end of the piston 81. In either event, it will be important that the volume occupied by the rod or rods on each side of piston 81 be identical as will be understood from further description of the operation of this sytem, since it becomes a closed system within that cylinder under certain circumstances and the volume must remain equalized on both sides of the piston. By supplying two rods it is possible to activate additional functions if desired, although only one function is herein illustrated.

One rod (in this case 83) will physically contact micro switch or the like 79 when in a certain position such as the equilibrium position shown in FIG. 2.

The rod or rods (in this case 84 and 85) on the other side of piston 81 will contact piston 88, and be affixed thereto, which piston is the piston of hydraulic cylinder 86 having a single outlet only 87. The outlet 87 is connected by line 89 to an hydraulic brake activating system of customary construction 96, which will in turn be connected by lines 94 and 92 to disc brakes such as 90, one of which will be upon each wheel of the trailer.

Customarily the hydraulic cylinder 86 may have a spring return in that portion intermediate the piston and the outlet end 87. Such spring will assist in the return during the operation is hereinafter described.

Figure 3:
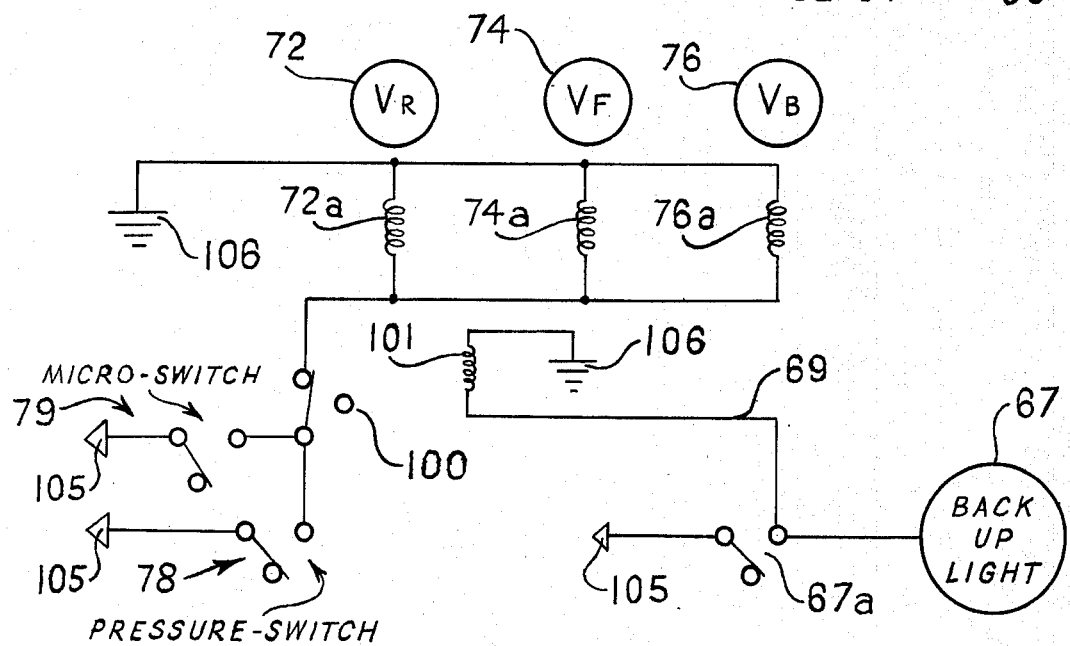
FIG. 3 is a schematic diagram of the electrical system utilized in an apparatus to practice the method of this invention.

The electrical circuitry to utilize the method of this invention is shown in FIG. 3. The three valves 72, 74 and 76 control the operation of the hydraulic system and these three valves are all solenoid-operated valves which have only two positions, the position allowing free flow through the valve, or a closed position. These positions will be referred to respectively as "open" and "closed". Under normal operation of the vehicle valves 72 and 74 wil be closed and valve 76 will be open.

Under the braking operation hereinafter described, this situation will be reversed by action of the solenoids indicated as 72-A, 74-A, and 76-A so that when this auxiliary braking system is in operation the valves 72 and 74 will be open and valve 76 will be closed.

One end of the solenoids operating the valves is connected to ground 106, and the other end is connected through the wiring shown to switch 100 activated by solenoid 101, also connected at one end to ground. This solenoid 100 will be activated whenever the backup light 67 is activated by backup light switch 67-A which is of course connected to the other electrical pole 105. Thus, when the vehicle is in backup or reverse mode, the switch 100 which is normally closed will be opened by the activation of solenoid 101 and the valves will remain in the position where 72 and 74 are closed and 76 is open.

When the truck is not in its reverse mode, there will be power available through swich 100 provided that the pressure switch 78 is activated or that the micro switch 79 is activated. The micro switch is so disposed that in the position shown in FIG. 2, wherein the cylinder rod is in contact with the micro switch, it will be open. When this physical contact is removed from the micro switch, it will close, by spring action or the like as is known in the art.

The pressure switch 78 will be set so as to activate when pressure reaches a predetermined value as will be understood by the following description, but which probably will be in the neighborhood of 4500 pounds per square inch, or such other value as may be determined.

In the operation of this system, the truck-tractor combination will operate in customary manner except that a portion of the torque and power delivered by the drive shaft 14 will be taken at all times by the operation of hydralic pump 20 and will be transferred to the trailer wheels through the hydraulic motor 52. The appropriate gearing and/or sprocket, and other arrangements so as to maintain equal speed to the contact surfaces of the truck's wheels and the trailer's wheels will be easily understood by those skilled in the art and this relationship should normally be maintained.

At any time when deceleration occurs, for example on a downhill run, in which the vehicle is in compression mode, it will be clear that the action of the running of the wheels of the trailer under compression wil tend to overdrive the motor in such manner that it will become a pump, in effect, and the pump in turn would have a tendency to become a motor. This will maintain a proper and straight alignment between truck and trailer as will be understood by those skilled in the art.

The important feature comes in more impressively, however, when it is undertood that upon application of brakes of the prime mover by the operator, the truck driving wheels could dramatically slow on a downhill run or the like particularly on wet surfaces. At this point, the trailer wheels will have a tendency violently to over run, and at this point is where there can be danger of a bad accident due to a jack-knife condition or the like. As equipped with an apparatus to practice the method of this invention, however, the pump is no longer supplying pressure to the motor, but on the other hand the motor has become a pump and the pressure of the return line 66 will increase dramatically. When it reaches a predetermined point, such as pressures in the neighborhood of 4500 psi, the pressure switch 78 will activate the solenoids and now the normally closed valves 72 and 74 have become open and the normally open valve has become closed. It will be obvious that the pressure being greater through line 66 will cause the piston 81 to move within cylinder 80 in the direction of cylinder 86. The moment the first movement takes place, the micro switch 79 will close and thus the valves will now remain in their new positions with 72 and 74 open and 76 closed. As the piston 81 moves in the direction of cylinder 86 the piston 88 will force a pressure into the hydraulic system applying the special disc brakes and will, depending upon the force, apply such disc brakes to the trailer wheels.

When the situation begins to normalize and the pressure drops in line 66 and increases in line 60, it will be clear that the piston 81 will once again move in the opposite direction towards the micro switch. When the system is completely normalized and the micro switch is contacted by the piston rod 83, the electrical system activating solenoid 72-A, 74-A, and 76-A will now be de-energized and the valves will return (by spring return or the like) to their normal positions with valves 72 and 74 now normally closed and valve 76 normally open. In this manner there is equilibrium within the system and the motor 52 is once again acting as a motor and the pump 20 is once again acting as a pump.

The reason for the activation of switch 100 when in the reverse mode, is to prevent a locking of the brake by any reversing of the pressure situation within the system as will be clear to those skilled in the art.

The method of this invention, then, is seen to include the method of application of braking wherein the braking torque of an overdriven motor is dynamically augmented so as to add the effect of a friction brake to the otherwise normal negative torque of the overdriven motor in a manner proportional to the negative torque generated by the overdriven motor.

Understanding the operation of the particular apparatus illustrated to apply this method, it will occur to those skilled in the art that perhaps another apparatus might be utilized for the practicing of this method. As an example, it will be understood that a generator to generate electrical power might be utilized in place of the pump 20 and a motor utilizing electrical power might be utilized in place of the motor 52. By appropriate electrical connection, the over-riding of the motor so as to cause it to act as a generator under the conditions described with relation to the hydraulic system could cause a reverse flow of electricity which can be sensed and amplified so as to accomplish a result similar to that set forth by the hydraulic system described in detail.

While an automotive vehicle has been illustrated herein, it is to be understood that the principle involved is as previously stated wherein this is a method for dynamically augmenting the braking torque of an overdriven motor where the negative torque from a friction brake is added to the negative torque of the overdriven motor in proportion to the negative torque generated by the overdriven motor. Understanding this theory, it may occur to those skilled in the art that this method would have application to other instances of an overdriven motor of some type.

It should also be noted that the force generated by the double acting cylinder illustrated in this particular embodiment is not limited to hydraulic brake activation. For example, pneumatic brake or electrical brakes or the like could also be so activated.

While the embodiments of this invention specifically shown and described are fully capable of achieving the objects and advantages desired, it should be understood that these embodiments are for purposes of illustration, and not for purposes of limitation.

I claim:

1. The combination with at least one wheel of the vehicle traveling upon wheels of: hydraulic motor means attached to said wheel; hydraulic pump means hydraulically connected to said motor, by a feed line and a return line; a connection from said feed line to one port of a double acting hydraulic cylinder; a connection from said return line to a second port of said double acting hydraulic cylinder; a bypass line between the ports of said double acting cylinder; means activated by said double acting hydraulic cylinder to activate an hydraulic brake system on said vehicle; and means to interrupt the flow of hydraulic fluid from the said feed line and return line to the said double acting hydraulic cylinder.

2. The device of claim 1 in which the means to interrupt the flow of fluid between the feed and return lines and the said double acting cylinder comprise electrically operated valves, and in which an electrically operated valve is inserted in the said bypass line.

3. The device of claim 2 in which the electrically operated valves are activated by means of a pressure switch connected to the feed line or the return line.

4. The device of claim 3 in which the said pressure switch activates the said valves and an auxiliary switch activated by the double acting cylinder also activates said valves.

5. The device of claim 4 in which the said pressure switch and the said microswitch are deactivated so as to prevent electrical current flowing to the said electrically activated valves during those times when the vehicle is reversing its direction.

* * * * *